US012715450B2

(12) United States Patent
Berkel et al.

(10) Patent No.: US 12,715,450 B2
(45) Date of Patent: Aug. 25, 2026

(54) COMPUTER-IMPLEMENTED METHOD FOR DESIGNING A STATE CONTROLLER WITH STOCHASTIC OPTIMIZATION

(71) Applicant: Robert Bosch GmbH, Stuttgart (DE)

(72) Inventors: Felix Berkel, Schifferstadt (DE); Kevin Schmidt, Herrenberg (DE); Melanie Gallant, Kirchheim Unter Teck (DE); Thomas Specker, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 64 days.

(21) Appl. No.: 18/621,281

(22) Filed: Mar. 29, 2024

(65) Prior Publication Data

US 2024/0326835 A1 Oct. 3, 2024

(30) Foreign Application Priority Data

Apr. 3, 2023 (DE) ........................ 102023203084.5

(51) Int. Cl.
*B60W 50/00* (2006.01)
*G06F 17/11* (2006.01)

(52) U.S. Cl.
CPC ............ *B60W 50/00* (2013.01); *G06F 17/11* (2013.01); *B60W 2050/0008* (2013.01); *B60W 2050/0018* (2013.01)

(58) Field of Classification Search
CPC .......... B60W 50/00; B60W 2050/0008; G06F 17/11
See application file for complete search history.

(56) References Cited

U.S. PATENT DOCUMENTS

2015/0375719 A1* 12/2015 Zhang ..................... B60T 8/175 701/70
2020/0006946 A1* 1/2020 Fife ......................... H02J 3/008
2021/0221386 A1* 7/2021 Quirynen .............. B60W 30/18
2021/0373513 A1* 12/2021 Quirynen ................ G06F 17/13
2023/0022510 A1* 1/2023 Quirynen ............. G05B 13/048
2023/0288886 A1* 9/2023 Berntorp .............. G05B 13/048

OTHER PUBLICATIONS

Prof. Dr.-Eng. Nelles, Oliver: "State Space and Digital Control," (2018), University of Siegen, pp. 1-288, with English translation of excerpts.

* cited by examiner

*Primary Examiner* — Kenneth M Dunne
(74) *Attorney, Agent, or Firm* — NORTON ROSE FULBRIGHT US LLP

(57) ABSTRACT

A computer-implemented method for designing a state controller with stochastic optimization includes receiving a state space model for describing a system to be controlled, wherein the state space model comprises a system matrix, a state vector which contains one or more state variables, an input matrix, and an input variable vector, wherein the input variable vector is based on the state vector and a feedback matrix which describes the state controller, and the one or more state variables are described on the basis of one or more probability distributions. The method further includes describing an optimization problem which includes a cost function which is calculated at least using the system matrix, the feedback matrix, an initial state, and the input matrix, and solving the optimization problem in order to determine the entries of the feedback matrix.

13 Claims, 3 Drawing Sheets

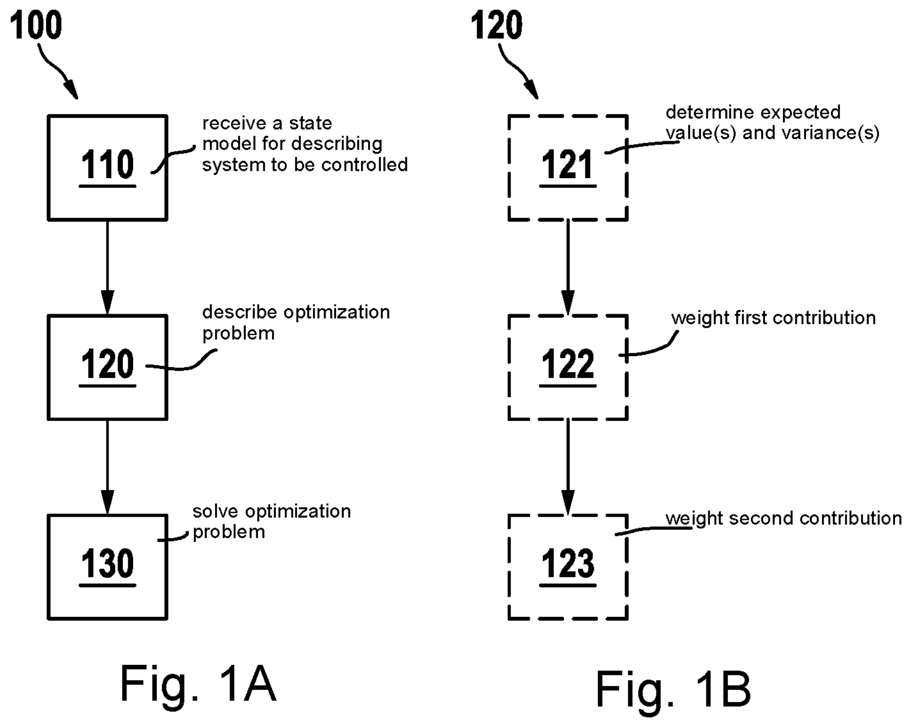
Fig. 1A
Fig. 1B
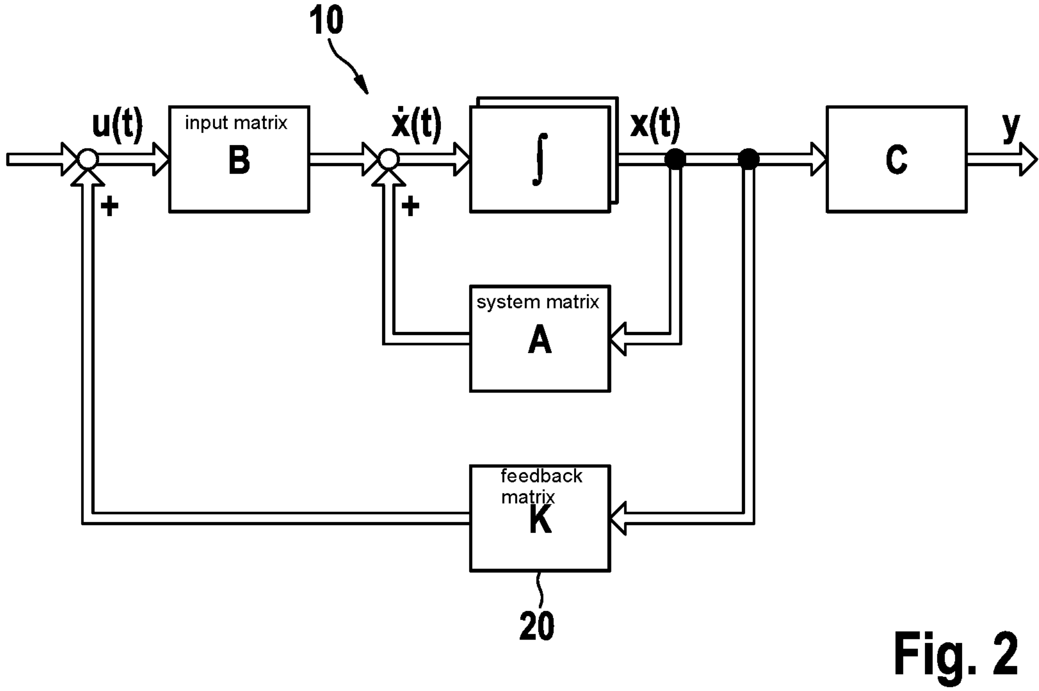
Fig. 2

COMPUTER-IMPLEMENTED METHOD FOR DESIGNING A STATE CONTROLLER WITH STOCHASTIC OPTIMIZATION

BACKGROUND INFORMATION

Highly automated or autonomous systems are increasingly in focus, for example, in robotics and in the automotive sector. Especially control systems are becoming increasingly important in the operation of autonomous or highly automated systems. In highly automated and autonomous driving, the transverse guidance of the vehicle plays a central role. The object of transverse guidance is to maintain a stable lateral distance of the vehicle from a predetermined route or the lane edge and/or the roadway edge. Although numerous methods have been proposed for the control, these are usually based on nominal models, i.e., uncertainties such as external disturbances, parameter uncertainties, or model errors.

Uncertainties in the initial states of the control system and the variance resulting therefrom in the feedback of the control loop are the consequence of these uncertainties. The latter are unknown or difficult to quantify in the development phase and in the parametrization of the controller. For this reason, later in the application phase, the controller must be intensively tested against the uncertainties and adjusted. This is time-consuming and costly. Particularly due to the fact that development cycles, also due to the increasing software content, are increasingly shortening, market-specific disadvantages result from long product preparation times. For these reasons, there is a need for new controller design techniques that take into account the uncertainties mentioned and reduce the effort in the downstream test phases.

SUMMARY

A first general aspect of the present invention relates to a computer-implemented method for designing a state controller with stochastic optimization. According to an example embodiment of the present invention, the method comprises receiving a state space model for describing a system to be controlled, wherein the state space model comprises a system matrix, a state vector which contains one or more state variables, an input matrix, and an input variable vector, wherein the input variable vector is based on the state vector and a feedback matrix which describes the state controller, and the one or more state variables are described on the basis of one or more probability distributions. The method further comprises describing an optimization problem which comprises a cost function which is calculated at least using the system matrix, the feedback matrix, an initial state, and the input matrix, and solving the optimization problem in order to determine the entries of the feedback matrix.

A second general aspect of the present invention relates to a computer system that is designed to perform the computer-implemented method of designing a state controller with stochastic optimization according to the first general aspect (or an embodiment thereof).

A third general aspect of the present invention relates to a computer program comprising commands which, when the computer program is executed by a computer system, cause said computer system to execute the computer-implemented method for designing a state controller with stochastic optimization according to the first general aspect (or an embodiment thereof).

A fourth general aspect of the present invention relates to a computer-readable medium or signal that stores and/or contains the computer program according to the third general aspect (or an embodiment thereof).

The method according to the first general aspect (or an embodiment thereof) provided in this disclosure can serve to provide a computer-implemented method for designing a state controller with stochastic optimization. One advantage can be to reduce the time-to-market of highly automated control functions, since relevant uncertainties can already be taken into account in the design phase. The effort that must be expended in the verification/validation phase can thereby be reduced. Furthermore, a trade-off can be achieved between the robustness of the control system with respect to parametric uncertainties and disturbances and the performance of the control system. A further advantage can be seen in the fact that a confidence interval of the closed control loop can be deduced in order to be able to make stochastic statements about the performance. The techniques of the present invention can also be advantageous for checking existing control systems for their robustness or quantifying their deviation from an optimal regulation. Furthermore, the techniques of the present invention are not limited to the transverse guidance of a vehicle, but can be advantageous for a variety of regulations. In addition to the transverse guidance of the vehicle, the longitudinal control can also benefit from the techniques of the present invention. The present techniques are also advantageous for an approach that simultaneously controls the longitudinal and the transverse guidance.

Some terms are used in the present disclosure in the following way:

A "state controller" can comprise an algorithm, i.e., a calculation rule, which returns a state variable (i.e., the internal state of the control system) to an input variable. A state controller can comprise parameters which can weight the state variable. In examples, a state controller can be executed on a computer system. A state controller can, for example, comprise or be part of a hardware module with inputs and outputs.

A "vehicle" can be any device that transports passengers and/or freight. A vehicle can be a motor vehicle (for example a passenger car or a truck), but also a rail vehicle. A vehicle can also be a motorized two-wheeler or three-wheeler. However, floating and flying devices can also be vehicles. Vehicles can be operating or assisted at least partially autonomously.

BRIEF DESCRIPTION OF THE DRAWINGS

FIG. 1A to 1B schematically illustrate a computer-implemented method for designing a state controller with stochastic optimization, according to an example embodiment of the present invention.

FIG. 2 schematically illustrates an exemplary control loop according to one or more embodiments of the present invention.

DETAILED DESCRIPTION OF EXAMPLE EMBODIMENTS

Figure 3A:
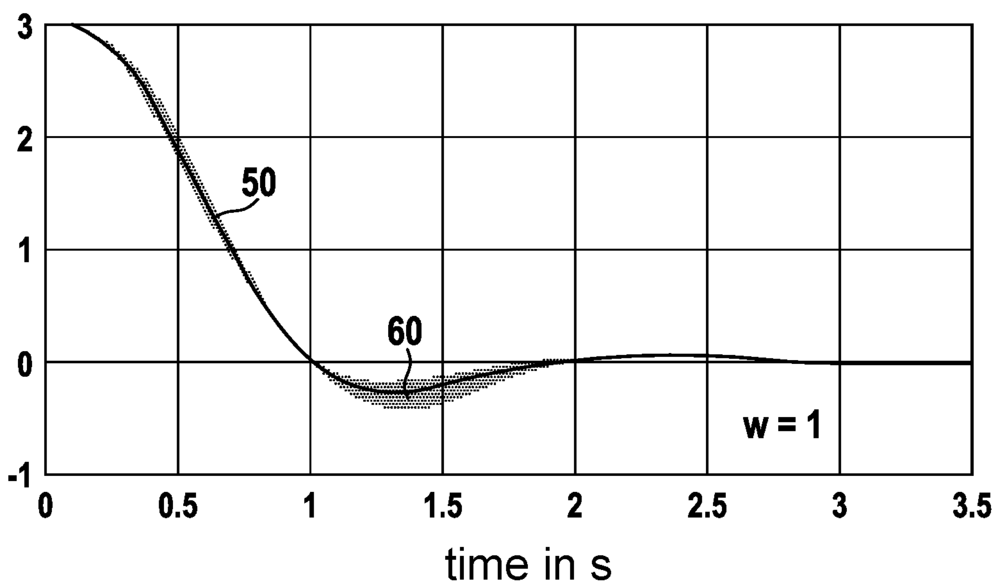
FIG. 3A to 3D illustrate exemplary system responses of a state controller designed with the method of the present invention, and system responses of a state controller designed in a conventional manner.
Figure 3B:
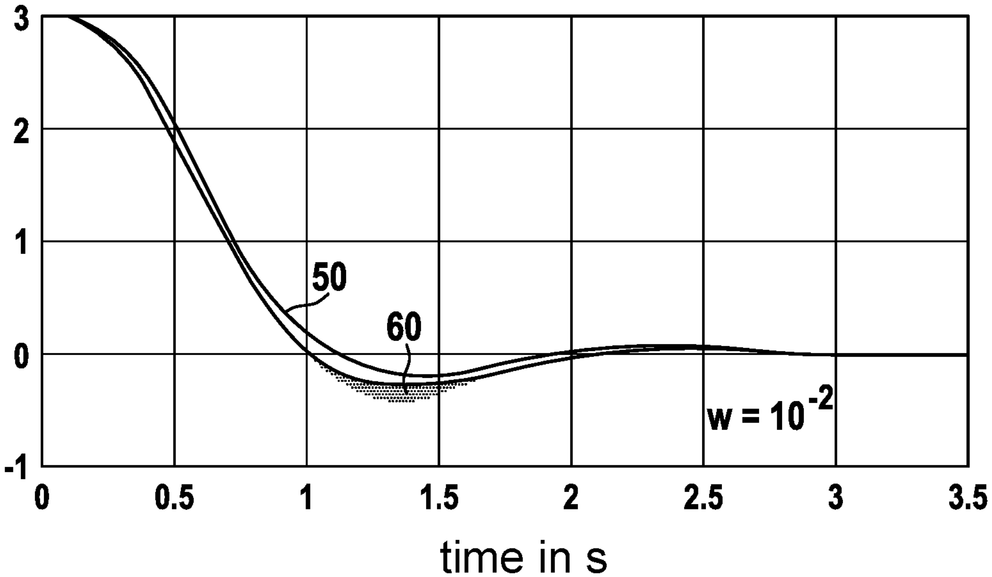
Figure 3C:
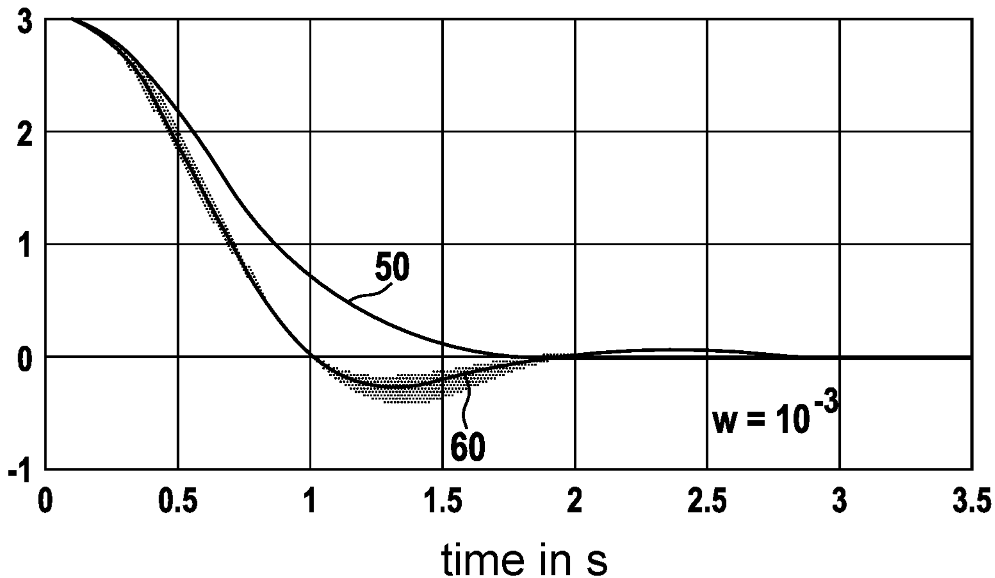
Figure 3D:
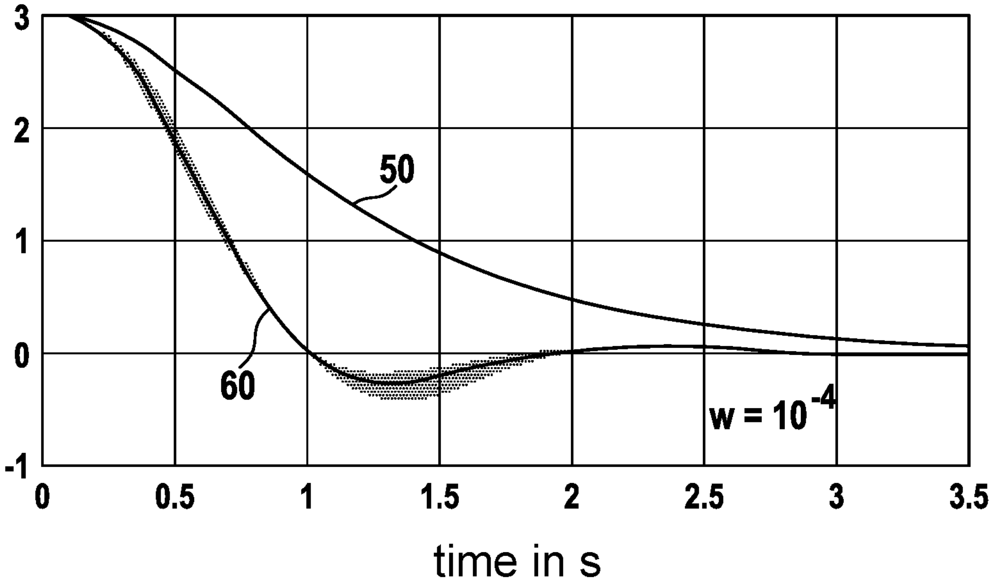

Firstly, the techniques of the present invention will be discussed with respect to FIG. 1A, FIG. 1B and FIG. 2. With respect to FIG. 3A to FIG. 3D, possible results and advantages will be discussed that result from the method disclosed herein for designing a state controller.

FIGS. 1A and 1B show a flow diagram that shows possible method steps of the computer-implemented method 100 for designing a state controller 20 with stochastic optimization. The computer-implemented method 100 for designing a state controller 20 with stochastic optimization comprises receiving 110 a state space model for describing a system 10 to be controlled. The state space model comprises a system matrix A, a state vector x(t,ξ) which contains one or more state variables $x_{1(t,\xi)}$, $x_{2(t,\xi)}$, $x_{3(t,\xi)}$, . . . , an input matrix B and an input variable vector u(t,ξ). The input variable vector u(t,ξ) is based on the state vector x(t,ξ) and on a feedback matrix K which describes the state controller. The one or more state variables $x_{1(t,\xi)}$, $x_{2(t,\xi)}$, $x_{3(t,\xi)}$, . . . are described on the basis of one or more probability distributions. The method 100 further comprises a describing 120 of an optimization problem which comprises a cost function J which is calculated at least using the system matrix A, the feedback matrix K, an initial state $x_0$, and the input matrix B, and the solution 130 to the optimization problem in order to determine the entries of the feedback matrix K. The system matrix A can comprise one or more coefficients whose description can be based on the one or more probability distributions. In one example, the state space model can be described by the equation $\dot{x}(t,\xi)=A(\xi)x(t,\xi)+B(\xi)u(t,\xi)$, where t>0, $x(0,\xi)=x_0(\xi)$. In one example, the state vector x(t,ξ) can be determined by measurement. In one example, the state vector x(t,ξ) can be reconstructed by means of an observer or an estimator. The parametric uncertainties are expressed in the present disclosure by the stochastic argument ξ. In one example, the control rule describes influencing the state vector x(t,ξ) with the aid of the return matrix K(t), e.g., by means of weighting, in order to enter the result of this influencing into the system to be controlled as an input variable vector u(t,ξ). In one example, the control rule can be expressed by means of the equation u(t,ξ)=K(t) x(t,ξ), from which the input variable vector u(t,ξ) is formed. In one example, the feedback matrix K can be time-varying, time-invariant, or constant. In one example, the feedback matrix K can be deterministic (optionally dependent on the cost function J). In one example, it is possible to take in to account non-measurable states $(x_i(t,\xi))$ that are accompanied by vanishing feedback gains $K_{ij}=0$ for all j≥1. Here, i denotes in the present disclosure the row index of the matrix, and J denotes the column index. This is an example of a limited definition set K∈K.

In one example, the describing 120 comprises determining 121 one or more expected values and one or more variances of the one or more state variable $sx_{1(t,\xi)}$, $x_{2(t,\xi)}$, $x_{3(t,\xi)}$ of the state vector x(t,ξ), and wherein the cost function J is furthermore formed by a first contribution that corresponds to the one or more expected values of the one or more state variables $x_{1(t,\xi)}$, $x_{2(t,\xi)}$, $x_{3(t,\xi)}$ of the state vector x(t,ξ), and a second contribution that corresponds to a variance or the plurality of variances of the one or more state variables $x_{1(t,\xi)}$, $x_{2(t,\xi)}$, $x_{3(t,\xi)}$, . . . of the state vector x(t,ξ). For example, the first contribution can comprise a first partial cost function $J_E$, and the second contribution can comprise a second partial cost function $J_{var}$. Furthermore, the cost function J can be formed from the first partial cost function $J_E$ and from the second partial cost function $J_{var}$ by mathematical combination, for example by addition. In one example, the describing 120 of the optimization problem serves to implement optimal regulation.

In one example, the describing 120 can comprise further weightings 122 of the first contribution using a first weighting matrix $W_E$ and weightings 123 of the second contribution using a second weighting matrix $W_{var}$. In one example, the cost function J can be expressed by the equation $JJ=J_E(E(x), E(u); W_E)+J_{var}(var(x), var(u); W_{var})$. In one example, the optimization problem can comprise a minimization of the cost function J with respect to the entries of the feedback matrix K. An associated optimization problem could then be formulated as follows:

$$\min_K \; J = J_E(E(x), E(u); W_E) + J_{var}(\text{var}(x), \text{var}(u); W_{var}) \tag{i}$$

$$\text{s.t.} \quad \dot{x} = Ax + B,\ t > 0,\ x(0) = x_0 \tag{ii}$$

$$u = Kx \tag{iii}$$

$$K \in \mathbb{K} \tag{iv}$$

In one example, the weighting 122 of the first contribution and the weighting 123 of the second contribution can be performed using a third weighting matrix Q and a fourth weighting matrix R. In one example, the feedback matrix K can describe a linear-quadratic controller, so that $J_E$ can be expressed by $$J_E = \int_0^\infty E(x)^T Q_E E(x) + E(u)^T R_E E(u) dt$$

and analogously thereto $J_{var}$ can be expressed by $$J_{var} = \int_0^\infty E(x)^T Q_{var} E(x) + E(u)^T R_{var} E(u) dt.$$

In this case, $Q_E=W_EQ$, $R_E=W_ER$, $Q_{var}=W_{var}Q$, and $R_{var}=W_{var}R$ can be calculated. In one example, the third weighting matrix Q and/or the fourth weighting matrix R can in each case be a positive semi-definite matrix. In one example, the first weighting matrix $W_E$ and/or the second weighting matrix $W_{var}$ can be a scalar. For example, the first weighting matrix $W_E$ and the second weighting matrix $W_{var}$ can depend on one another. For example, the first weighting matrix $W_E$ can be same as a scalar w, and $W_{var}=1-w$ can apply to the second weighting matrix. For example, the influence of the mean value or the variance on the cost function J can be defined by choosing the first weighting matrix $W_E$ and the second weighting matrix $W_{var}$ and/or the ratio of the first weighting matrix and the second weighting matrix to one another.

As introduced above, the describing 120 of the optimization problem can comprise determining 121 one or more expected values and one or more variances of the one or more state variables $x_{1(t,\xi)}$, $x_{2(t,\xi)}$, $x_{3(t,\xi)}$, . . . of the state vector x(t,ξ). In one example, the calculation of the one or more expected values and the one or more variances can be carried out by means of sampling, for example on the basis of a Monte Carlo simulation or a Latin hypercube sampling method. In the following, the exemplary calculation of the one or more expected values and the one or more variances will be discussed with reference to a polynomial chaos expansion (PCE). In one example, the describing 120 can also comprise performing one or more series developments based on the one or more probability distributions in order to describe the one or more state variables $x_{1(t,\xi)}$, $x_{2(t,\xi)}$, $x_{3(t,\xi)}$. In one example, the one or more probability distributions can be represented by one or more polynomial bases. For example, the series development of a state $x_{i(t,\xi)}$ can be expressed by the formulation $$x_{i(t,\xi)} = X_i^t(t)\varphi(\xi).$$

In this case, the term $\varphi(\xi)$ can comprise the one or more polynomial bases. In one example, $$x_{i(t,\xi)} = \sum_{j=0}^{P} X_{i,j}\phi_j(\xi)$$

can generally apply, wherein the coefficients $X_{i,j}$ can be calculated, for example, by an intrusive solution method or non-intrusive solution methods, and $\varphi_j(\xi)$ stands for the one or more polynomial bases. The target function $x_{i(t,\xi)}$ can be modeled by one or more polynomial bases using the above-described calculation rule. In one example, each polynomial base can be orthogonal to the probability distribution that it represents. In one example, the one or more polynomial bases can be at least one of Hermite polynomials, Legendre polynomials, Jacobi polynomials, and/or generalized Laguerre polynomials. In one example, the expected value of a state $x_i$ can be calculated by $E(x_i)(t)=m^tX_i(t)$. Here, m is an auxiliary vector that results from the polynomial base $\varphi(\xi)$. In one example, the variance of a state $x_i$ can be calculated by $$\mathrm{var}(x_i) = X_i^T(t)\left(f - \mathrm{mm}^T\right)X_i(t),$$

wherein f is also an auxiliary matrix which directly results from the polynomial base $\varphi(\xi)$. The calculation rule described herein based on polynomial chaos expansion can serve to calculate the one or more expected values and the one or more variances of the one or more state variables $x_{1(t,\xi)}$, $x_{2(t,\xi)}$, $x_{3(t,\xi)}$, of the state vector $x(t,\xi)$.

In one example, the first contribution and/or the second contribution each comprises an addition $Q+K^TRK$. In one example, the cost function J can be expressed in simplified form by the equation $$J = \int_0^\infty X^T\overline{Q}X dt = X_0^T P X_0,$$

wherein $X_0=X(0)$ can express the initial state of the system. In one example, P can be calculated by $$P = \int_0^\infty e^{\overline{A}_K^T t}\overline{Q}e^{\overline{A}_K t}dt,$$

wherein $\overline{A}_K$ results from $X^{\bullet}(t)=[A^{-}+B^{-}(K\otimes I)X(t)=A^{-}\_K X(t)$ and $\overline{A}$ and $\overline{B}$ result from the polynomial chaos expansion (PCE). In one example, the polynomial chaos expansion (PCE) can be carried out in a preprocessing step, which can be advantageous for reducing the computational effort in the solving 130 of the optimization problem. In one example with the first weighting matrix $W_E=w$ and the second weighting matrix, $W_{var}=1-w$, Q can be calculated as a result of the polynomial chaos expansion (PCE) with the equation $\overline{Q}=(1-w)[(Q+K^TRK)\otimes(f-mm^T)]+w[(Q+K^TRK)\otimes f]$.

In one example, the optimization problem can further comprise at least one of an optimality condition, a stability condition, and/or a restriction of the possible entries of the feedback matrix K by a definition set K. In one example, the following can apply to the optimization problem:

$$\min_K \; J = X_0^T P X_0 \qquad \text{(i)}$$

$$\text{s.t.} \;\; 0 = P\overline{A}_K + P\overline{A}_K^T + \overline{Q} \qquad \text{(ii)}$$

$$0 > P\overline{A}_K + P\overline{A}_K^T \qquad \text{(iii)}$$

$$K \in \mathbb{K} \qquad \text{(iv)}$$

In one example, the equation (ii) is the optimality condition, the equation (iii) is the stability condition, and the equation (iv) is the limitation of the possible entries of the feedback matrix K by the definition set K. The stability condition can be based on the Lyapunov equation.

In one example, the solution 130 to the optimization problem can be performed by means of a global search method, a simplex method, or a gradient method. In the event that, for example, a gradient method is carried out, the initial value $K_{ini}$ necessary for this purpose can for example, be determined by a linear-quadratic controller without taking into account uncertainties, an expert opinion or a global search. In one example, the quality of the solution can be arbitrary, i.e., a specific level does not have to be reached.

In one example, the system 10 to be controlled can be designed to be arranged in a vehicle and/or designed to control a vehicle function (in particular to control a driving function). For example, the vehicle function can be a function for autonomous and/or assisted driving. In some examples, the state controller 20 can be designed to be executed on a computer system of a vehicle (for example an autonomous, highly automated or assisted driving vehicle). For example, the computer system can be implemented locally in the vehicle or (at least partially) in a backend that is communicatively connected to the vehicle. For example, the computer system can comprise a control device on which the state controller 20 can be executed. In some examples, the vehicle can comprise a computer system with a communication interface which allows communication with a backend. For example, the state controller 20 can be executed in this backend. In one example, the system 10 to be controlled can be a system for transverse guidance and/or longitudinal guidance of the vehicle. Uncertainties that are described by means of the one or more probability distributions can comprise, for example, the load-dependent yaw inertia and the mass of the vehicle, the distances of the vehicle center of gravity relative to the axles, or the roadway friction with an influence on stiffnesses (or a combination thereof). In one example, the one or more random variables $x_{1(t,\xi)}$, $x_{2(t,\xi)}$, $x_{3(t,\xi)}$, . . . can be variables for at least one of a steering angle, an alignment angle, a yaw rate, a slip angle, and/or a lateral error. In one example, an entry of the input variable vector $u(t,\xi)$ can be the steering speed.

The present invention also relates to methods for controlling a vehicle using a state controller designed by means of the method of the present invention. In some examples, the state controller 20 and/or the system 10 to be controlled can be designed as described above.

In other examples, the system 10 to be controlled can be arranged in a robot, and/or can be designed to control a robot function (in particular for controlling a movement function of a robot). For example, the system to be controlled can be a system for transverse guidance and/or longitudinal guidance of the robot. In some examples, the state controller 20 can be executed on a computer system of a robot. For example, the computer system can be locally implemented in the robot or (at least partially) in a backend that is communicatively connected to the robot.

The present invention also relates to methods for controlling a robot using a state controller designed by means of the method of the present invention. In some examples, the state controller 20 and/or the system 10 to be controlled can be designed as described above.

In the following, the advantages of the techniques of the present invention compared to the related art will be explained by means of FIG. 3A to FIG. 3D. FIG. 3A to FIG. 3D show the controller responses for a controlled lane change of a vehicle. The responses 60 are the controller responses of a conventional linear-quadratic controller which is designed according to the related art techniques, and the responses 50 are the controller responses of the state controller which is designed by means of the method of the present invention. With decreasing values w, the state controller becomes more conservative, but has less variance. When $w=10^{-3}$, a comparable rise time can be achieved as in a conventional controller, but with less variance and without overshooting.

A computer system is also disclosed which is designed to execute the computer-implemented method 100 for designing a state controller 20 with stochastic optimization. The computer system can comprise at least one processor and/or at least one working memory. The computer system can furthermore comprise a (non-volatile) memory.

A computer program is also disclosed comprising commands which, when the computer program is executed by a computer system, cause said computer system to execute the computer-implemented method 100 for designing a state controller 20 with stochastic optimization. The computer program can be present, for example, in interpretable or in compiled form. For execution, it can (even in parts) be loaded into the RAM of a computer, for example as a bit or byte sequence.

A computer-readable medium or signal that stores and/or contains the computer program or at least a portion thereof is also disclosed. The medium can comprise, for example, any one of RAM, ROM, EPROM, HDD, SDD, . . . , on/in which the signal is stored.

The invention claimed is:

1. A computer-implemented method comprising the following steps:

receiving a state space model for describing a system to be controlled, wherein:

the state space model includes a system matrix, a state vector that contains one or more state variables, an input matrix, and an input variable vector;

the input variable vector is based on the state vector; and each of at least one of the state variables is associated with a respective probability distribution that characterizes uncertainty in a respective system state to which the respective state variable corresponds;

formulating a stochastic optimization problem that includes a cost function that is based on the probability distributions and is calculated using the system matrix, a feedback matrix that describes a state controller, an initial state, and the input matrix, wherein the cost function is formed by (a) a first contribution corresponding to respective expected values of the one or more state variables and (b) a second contribution corresponding to one or more variances of the one or more state variables;

solving the stochastic optimization problem to determine entries of the feedback matrix; and designing the state controller based on the feedback matrix whose entries are determined from the solving of the stochastic optimization problem, wherein:

the state vector represents system states of the system to be controlled during operation of the system;

the input variable vector represents control inputs applied to the system to be controlled during the operation of the system;

the feedback matrix defines a state-feedback relationship by which, during the operation of the system to be controlled using the state controller, the input variable vector is determined from the state vector; and incorporation of the feedback matrix having the determined entries into the state controller provides reduced variability of the one or more state variables of the state vector such that fluctuations of the state variables of the state vector, during operation of the system using the state controller to produce control inputs from the input variable vector, are attenuated under the characterized uncertainty as a result of the variance contribution of the cost function, thereby stabilizing operation of the system to be controlled.

2. The computer-implemented method according to claim 1, wherein the solving of the stochastic optimization problem is performed such that the cost function is minimized with respect to the entries of the feedback matrix.

3. The computer-implemented method according to claim 1, wherein the optimization problem further includes at least one of an optimality condition, and/or a stability condition, and/or a restriction of the possible entries of the feedback matrix by a definition set.

4. The computer-implemented method according to claim 1, wherein the system to be controlled is arranged in and/or is configured to control a vehicle.

5. The computer-implemented method according to claim 4, wherein the system to be controlled provides transverse guidance and/or longitudinal guidance of the vehicle.

6. A computer system configured to design a state controller, the computer system configured to:

receive a state space model for describing a system to be controlled, wherein:

the state space model includes a system matrix, a state vector that contains one or more state variables, an input matrix, and an input variable vector;

the input variable vector is based on the state vector; and each of at least one of the state variables is associated with a respective probability distribution that characterizes uncertainty in a respective system state to which the respective state variable corresponds; formulate a stochastic optimization problem that includes a cost function that is based on the probability distributions and is calculated using the system matrix, a feedback matrix that describes a state controller, an initial state, and the input matrix, wherein the cost function is formed by (a) a first contribution corresponding to respective expected values of the one or more state variables and (b) a second contribution corresponding to one or more variances of the one or more state variables;

solve the stochastic optimization problem to determine entries of the feedback matrix; and design the state controller based on the feedback matrix whose entries are determined from the solving of the stochastic optimization problem, wherein:

the state vector represents system states of the system to be controlled during operation of the system;

the input variable vector represents control inputs applied to the system to be controlled during the operation of the system;

the feedback matrix defines a state-feedback relationship by which, during the operation of the system to be controlled using the state controller, the input variable vector is determined from the state vector; and incorporation of the feedback matrix having the determined entries into the state controller provides reduced variability of the one or more state variables of the state vector such that fluctuations of the state variables of the state vector, during operation of the system using the state controller to produce control inputs from the input variable vector, are attenuated under the characterized uncertainty as a result of the variance contribution of the cost function, thereby stabilizing operation of the system to be controlled.

7. A non-transitory computer-readable medium on which is stored a computer program that is executable by a computer system and that, when executed by the computer system, causes the computer system to perform the following steps:

receiving a state space model for describing a system to be controlled, wherein the state space model includes a system matrix, a state vector which contains one or more state variables, an input matrix, and an input variable vector, wherein the input variable vector is based on the state vector;

modeling each of at least one of the state variables as a respective random variable having an associated probability distribution that characterizes uncertainty in a respective system state to which the respective state variable corresponds;

formulating a stochastic optimization problem that includes a cost function which is calculated at least using the system matrix, a feedback matrix that describes the state controller, an initial state, and the input matrix, wherein (a) the cost function includes at least an expected value component that is based on the probability distribution, and (b) the feedback matrix defines a state feedback by which the input variable vector is determined based on the state vector;

solving the stochastic optimization problem to determine entries of the feedback matrix based on the modeled probability distribution of the at least one state variable, such that the cost function is minimized with respect to the feedback matrix; and generating a state controller of a vehicle incorporating the feedback matrix, the state controller being configured to control a drive operation of the vehicle according to the input variable vector obtained using the feedback matrix, wherein:

the state vector represents system states of the system to be controlled during operation of the system;

the input variable vector represents control inputs applied to the system to be controlled during the operation of the system;

the feedback matrix defines a state-feedback relationship by which, during the operation of the system to be controlled using the state controller, the input variable vector is determined from the state vector; and incorporation of the feedback matrix having the determined entries into the state controller provides reduced variability of the one or more state variables of the state vector such that fluctuations of the state variables of the state vector, during operation of the system using the state controller to produce control inputs from the input variable vector, are attenuated under the characterized uncertainty as a result of the variance contribution of the cost function, thereby stabilizing operation of the system to be controlled.

8. A computer-implemented method comprising the following steps:

receiving a state space model for describing a system to be controlled, wherein the state space model includes a system matrix, a state vector which contains one or more state variables, an input matrix, and an input variable vector, wherein the input variable vector is based on the state vector, and a feedback matrix which describes the state controller, and the one or more state variables are described based on one or more probability distributions;

describing an optimization problem that includes a cost function which is calculated at least using the system matrix, the feedback matrix, an initial state, and the input matrix;

solving the optimization problem to determine entries of the feedback matrix; and generating a state controller of a vehicle incorporating the feedback matrix, the state controller being configured to control a drive operation of the vehicle according to the input variable vector obtained using the feedback matrix;

wherein:

(I) the describing includes determining one or more expected values and one or more variances of the one or more state variables of the state vector, the cost function being formed by (a) a first contribution that corresponds to the one or more expected values of the one or more state variables of the state vector, and (b) a second contribution that corresponds to the one or more variances of the one or more state variables of the state vector;

(II) the describing includes performing one or more series developments based on the one or more probability distributions to describe the one or more state variables; and/or (III) the one or more probability distributions are represented by one or more polynomial bases; and wherein:

the state vector represents system states of the system to be controlled during operation of the system;

the input variable vector represents control inputs applied to the system to be controlled during the operation of the system;

the feedback matrix defines a state-feedback relationship by which, during the operation of the system to be controlled using the state controller, the input variable vector is determined from the state vector; and incorporation of the feedback matrix having the determined entries into the state controller provides reduced variability of the one or more state variables of the state vector such that fluctuations of the state variables of the state vector, during operation of the system using the state controller to produce control inputs from the input variable vector, are attenuated under the characterized uncertainty as a result of the variance contribution of the cost function, thereby stabilizing operation of the system to be controlled.

9. The computer-implemented method according to claim 8, wherein the describing includes the determining of the one or more expected values and the one or more variances of the one or more state variables of the state vector, and wherein the cost function is formed by the first contribution that corresponds to the one or more expected values of the one or more state variables of the state vector and the second contribution that corresponds to the one or more variances of the one or more state variables of the state vector.

10. The computer-implemented method according to claim 9, wherein the describing of the optimization problem further includes:

weighting the first contribution using a first weighting matrix, and weighting the second contribution using a second weighting matrix.

11. The computer-implemented method according to claim 8, wherein the describing includes the performing of the one or more series developments based on the one or more probability distributions to describe the one or more state variables.

12. The computer-implemented method according to claim 8, wherein the one or more probability distributions are represented by the one or more polynomial bases.

13. A computer-implemented method comprising the following steps:

receiving a state space model for describing a vehicle to be controlled, wherein:

the state space model includes a system matrix, a state vector that contains one or more state variables, an input matrix, and an input variable vector;

the input variable vector is based on the state vector; and each of at least one of the state variables is associated with a respective probability distribution that characterizes uncertainty in a respective system state to which the respective state variable corresponds;

formulating a stochastic optimization problem that includes a cost function that is based on the probability distributions and is calculated using the system matrix, a feedback matrix that describes a state controller, an initial state, and the input matrix, wherein the cost function is formed by (a) a first contribution corresponding to respective expected values of the one or more state variables and (b) a second contribution corresponding to one or more variances of the one or more state variables;

solving the stochastic optimization problem to determine entries of the feedback matrix;

designing the state controller based on the feedback matrix whose entries are determined from the solving of the stochastic optimization problem; and during operation of the vehicle, controlling at least one of transverse guidance or longitudinal guidance of the vehicle by:

determining, using the state controller, the input variable vector from the state vector in accordance with the feedback matrix; and applying the determined input variable vector as control inputs to a system of the vehicle to influence movement of the vehicle.

* * * * *